(12) United States Patent
Hirose et al.

(10) Patent No.: US 12,311,490 B2
(45) Date of Patent: May 27, 2025

(54) MACHINE TOOL SYSTEM

(71) Applicant: MURATA MACHINERY, LTD., Kyoto (JP)

(72) Inventors: Mitsunori Hirose, Inuyama (JP); Yasuo Komori, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 443 days.

(21) Appl. No.: 17/925,040

(22) PCT Filed: Apr. 14, 2021

(86) PCT No.: PCT/JP2021/015429
§ 371 (c)(1),
(2) Date: Nov. 14, 2022

(87) PCT Pub. No.: WO2021/235142
PCT Pub. Date: Nov. 25, 2021

(65) Prior Publication Data
US 2023/0182251 A1    Jun. 15, 2023

(30) Foreign Application Priority Data
May 18, 2020 (JP) ................ 2020-086628

(51) Int. Cl.
*B23Q 7/04* (2006.01)
*B23B 3/16* (2006.01)
(Continued)

(52) U.S. Cl.
CPC ............. *B23Q 7/14* (2013.01); *B23B 3/168* (2013.01); *B23Q 1/015* (2013.01); *B23Q 7/04* (2013.01);
(Continued)

(58) Field of Classification Search
CPC ............. Y10T 82/2566; Y10T 408/91; Y10T 409/309576; Y10T 82/2514–2521;
(Continued)

(56) References Cited

U.S. PATENT DOCUMENTS 5,081,889 A * 1/1992 Takano ................ B23Q 7/048
82/122
6,960,050 B2 * 11/2005 Kosmowski ....... B23Q 11/0003
408/46
(Continued)

FOREIGN PATENT DOCUMENTS

| CN | 201002184 Y | 1/2008 |
| JP | 2003039271 A | 2/2003 |
| JP | 2016-043453 A * | 4/2016 |

OTHER PUBLICATIONS

Machine Translation of JP 2016-043453 A, which JP '453 was published Apr. 4, 2016.*

(Continued)

*Primary Examiner* — Erica E Cadugan
(74) *Attorney, Agent, or Firm* — Keating & Bennett, LLP

(57) ABSTRACT

A machine tool system includes a machine tool including a processor to process a workpiece with a tool, and a bed on which the processor is mounted, a transport apparatus including two, left and right, legs spaced apart from the bed to transport the workpiece and feed the workpiece to the processor or discharge the workpiece from the processor, and a plate that connects the bed to the legs and is elastically deformable. The plate is upright such that a plate surface is aligned with a front-rear direction, and a connection portion of the plate that connects with the bed and a connection portion of the plate that connects with the legs are displaced in a front-back direction.

10 Claims, 12 Drawing Sheets

(51) Int. Cl.
   *B23B 11/00* (2006.01)
   *B23B 17/00* (2006.01)
   *B23Q 1/01* (2006.01)
   *B23Q 7/14* (2006.01)
   *B23Q 11/00* (2006.01)
   *B23Q 39/04* (2006.01)
   *B23Q 41/02* (2006.01)
   *B23B 13/04* (2006.01)
   *B23Q 39/00* (2006.01)

(52) U.S. Cl.
   CPC ........ *B23Q 7/1494* (2013.01); *B23Q 11/0032* (2013.01); *B23Q 41/02* (2013.01); *B23B 13/04* (2013.01); *B23Q 2039/002* (2013.01); *B23Q 2039/004* (2013.01); *B23Q 2039/008* (2013.01); *B23Q 39/04* (2013.01); *B23Q 2701/01* (2013.01); *B23Q 2707/003* (2013.01); *Y10T 29/5109* (2015.01); *Y10T 82/2514* (2015.01); *Y10T 82/2566* (2015.01)

(58) Field of Classification Search
   CPC . Y10T 408/52–54; Y10T 409/30532–305432; Y10T 408/76; Y10T 409/304312; B23Q 1/01–1/017; B23Q 2701/01; B23Q 2701/00; B23Q 41/02; B23Q 11/0032
   USPC .............. 82/149, 124–127; 40/234; 409/235, 409/159–161, 172–173, 141; 408/69–70, 408/143
   See application file for complete search history.

(56) References Cited

U.S. PATENT DOCUMENTS

| | | | | |
|---|---|---|---|---|
| 2012/0006163 | A1* | 1/2012 | Taira | B23Q 11/0032 82/152 |
| 2013/0333532 | A1* | 12/2013 | Watanabe | B23Q 11/0032 82/124 |
| 2014/0319746 | A1 | 10/2014 | Kozawa | |

OTHER PUBLICATIONS

Official Communication issued in International Patent Application No. PCT/JP2021/015429, mailed on Jul. 13, 2021.

* cited by examiner

MACHINE TOOL SYSTEM

BACKGROUND OF THE INVENTION

1. Field of the Invention

The present invention relates to a machine tool system.

2. Description of the Related Art

There is known a machine tool system that includes a machine tool having a processor to process a workpiece with a tool, and a bed on which the processor is mounted, and a transport apparatus that has a plurality of legs, that transports the workpiece, and that feeds the workpiece to the processor or discharges the workpiece from the processor (see Japanese Patent No. 5708825). Japanese Patent No. 5708825 discloses a configuration in which the legs of the transport apparatus are installed on the floor surface independently of the bed of the machine tool as shown in FIG. 9. Japanese Patent No. 5708825 also discloses a configuration in which the legs of the transport apparatus are mounted on the bed of the machine tool as shown in FIG. 8.

SUMMARY OF THE INVENTION

In the machine tool system shown in FIG. 9 of Japanese Patent No. 5708825, the legs of the transport apparatus are installed independently of the bed of the machine tool, and as a result, vibrations occurring at the time of driving the transport apparatus are unlikely to be transmitted to the bed and thus have a limited influence on workpiece processing accuracy. However, since the bed and the legs are independent of each other, the transport apparatus and the machine tool may be displaced relatively to each other, which may hinder transfer of the workpiece between the transport apparatus and the machine tool. In the machine tool system shown in FIG. 8 of Japanese Patent No. 5708825, the legs of the transport apparatus are installed on the bed of the machine tool, and as a result, vibrations occurring at the time of driving the transport apparatus are likely to be transmitted to the bed (processor) and may thus have an increased influence on workpiece processing accuracy, while the transport apparatus and the machine tool are unlikely to be displaced relatively to each other.

Preferred embodiments of the present invention provide machine tool systems each capable of reducing or preventing displacement of relative positions of a transport apparatus and a machine tool while suppressing a reduction in workpiece processing accuracy caused by vibrations of the transport apparatus.

A machine tool system according to a preferred embodiment of the present invention includes a machine tool including a processor to process a workpiece with a tool, and a bed on which the processor is mounted, a transport apparatus including two, left and right, legs spaced apart from the bed to transport the workpiece and feed the workpiece to the processor or discharge the workpiece from the processor, and a plate that connects the bed to the legs and is elastically deformable, wherein the plate is upright such that a plate surface is aligned with a front-rear direction, and a connection portion of the plate that connects with the bed and a connection portion of the plate that connects with the legs are displaced in a front-back direction.

The machine tool system of the above preferred embodiment reduces or prevents transmission of vibrations of the transport apparatus, which occur when a workpiece is transported or discharged, to the bed (processor), so that it is possible to reduce or prevent deterioration of workpiece processing accuracy. Since the legs of the transport apparatus are connected to the bed by a plate, relative displacement between the transport apparatus and the machine tool is regulated, and transfer of a workpiece can thus be performed smoothly between the transport apparatus and the machine tool.

In the above machine tool system, the processor may include a main spindle to hold and rotate a workpiece, and the tool may move in a left-right direction to regulate a depth of cutting in the workpiece being rotated. With this configuration, it is possible to suppress a reduction in positional accuracy of the cutting depth of the tool with respect to a workpiece. In the above machine tool system, the legs may be in contact with a mounting surface on which the bed is mounted. With this configuration, it is possible to maintain the positional relationship between the legs and the bed in the left-right direction via the plate while releasing the load of the transport apparatus to the mounting surface. In the above machine tool system, the legs may be spaced apart in the up-down direction from the mounting surface, on which the bed is mounted. With this configuration, it is possible to reduce or prevent transmission of vibrations in the left-right direction to the bed while receiving the load of the transport apparatus via the plate. In the above machine tool system, the plate has a rigidity capable of receiving the load of the transport apparatus in the vertical direction. With this configuration, the plate can reliably support the load of the transport apparatus. In the above machine tool system, the bed may have a support in contact with the mounting surface, and the legs may be directly above or in the vicinity of a position directly above the supporter and may be apart from the bed. With this configuration, the load of the transport apparatus is applied to a position directly above or to a position in the vicinity of a position directly above the supporter, so that vibrations of the legs can be quickly transmitted to the mounting surface, and furthermore it is possible to reduce or prevent a bending moment and the like from occurring in the bed of the machine tool. In the above machine tool system, an additional leg may be provided behind each of the two legs, and the plate may connect the two legs and the additional leg. With this configuration, it is possible, with one plate, to connect the two legs and the additional leg to the bed. In the above machine tool system, a connection portion of the plate that connects with the bed may be provided between a connection portion that connects with the two legs and a connection portion that connects with the additional leg. With this configuration, it is possible to reduce or prevent transmission of vibrations in the left-right direction of the additional leg to the bed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
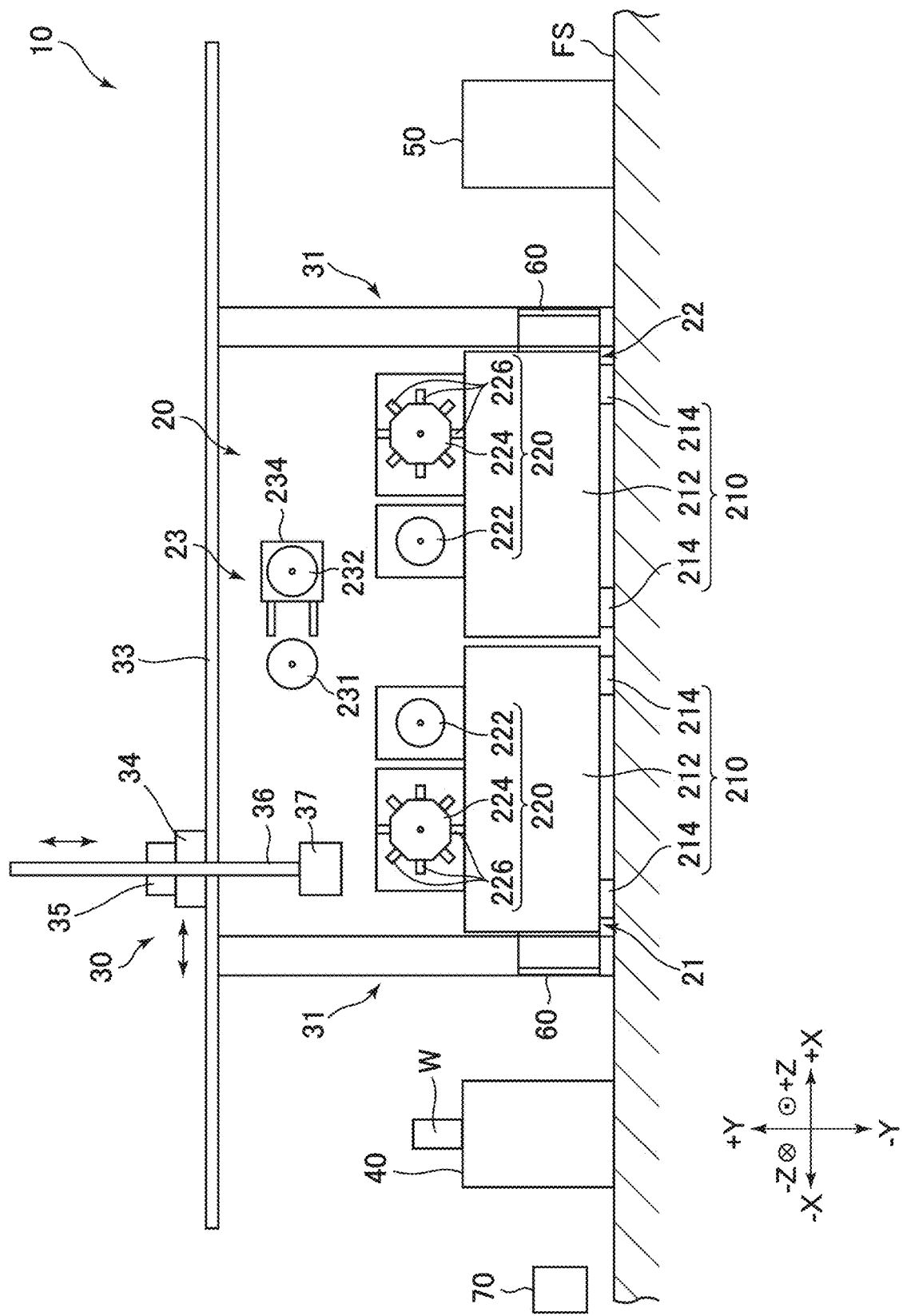
FIG. 1 is a front elevation view showing an example of a machine tool system according to a first preferred embodiment of the present invention.

Hereinafter, preferred embodiments will be described. In the drawings referred to in the following description, from the viewpoint of simplification of the description, scale may be changed as necessary such as by illustrating a component or an element in a size that differs from the actual size thereof, or by enlarging or emphasizing it to make a contrast with other components or elements. In the drawings, an XYZ Cartesian coordinate system is used to describe directions of components or elements in each drawing. The X directions indicate left-right directions of a machine tool system 10, with the +X direction being the right side and the −X direction being the left side when the machine tool system 10 is viewed from the front side. The Y directions indicate up-down directions of the machine tool system 10, with the +Y direction being the upper side and the −Y direction being the lower side. The Z directions are directions orthogonal to the X directions and the Y directions and indicate front-rear directions of the machine tool system 10, with the +Z direction being the front side and the −Z direction being the rear side when the machine tool system 10 is viewed from the front side.

First Preferred Embodiment

Figure 2:
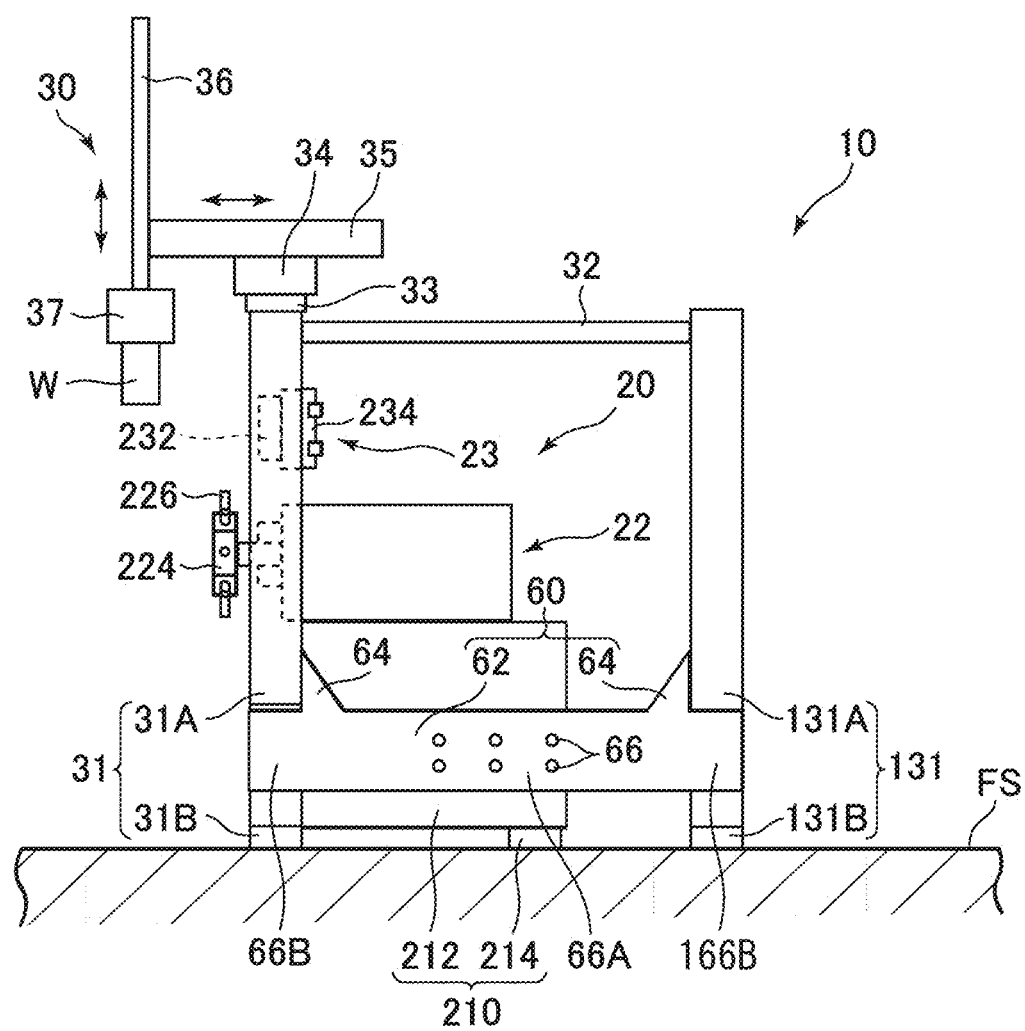
FIG. 2 is a right-side view of the machine tool system shown in FIG. 1.
Figure 3:
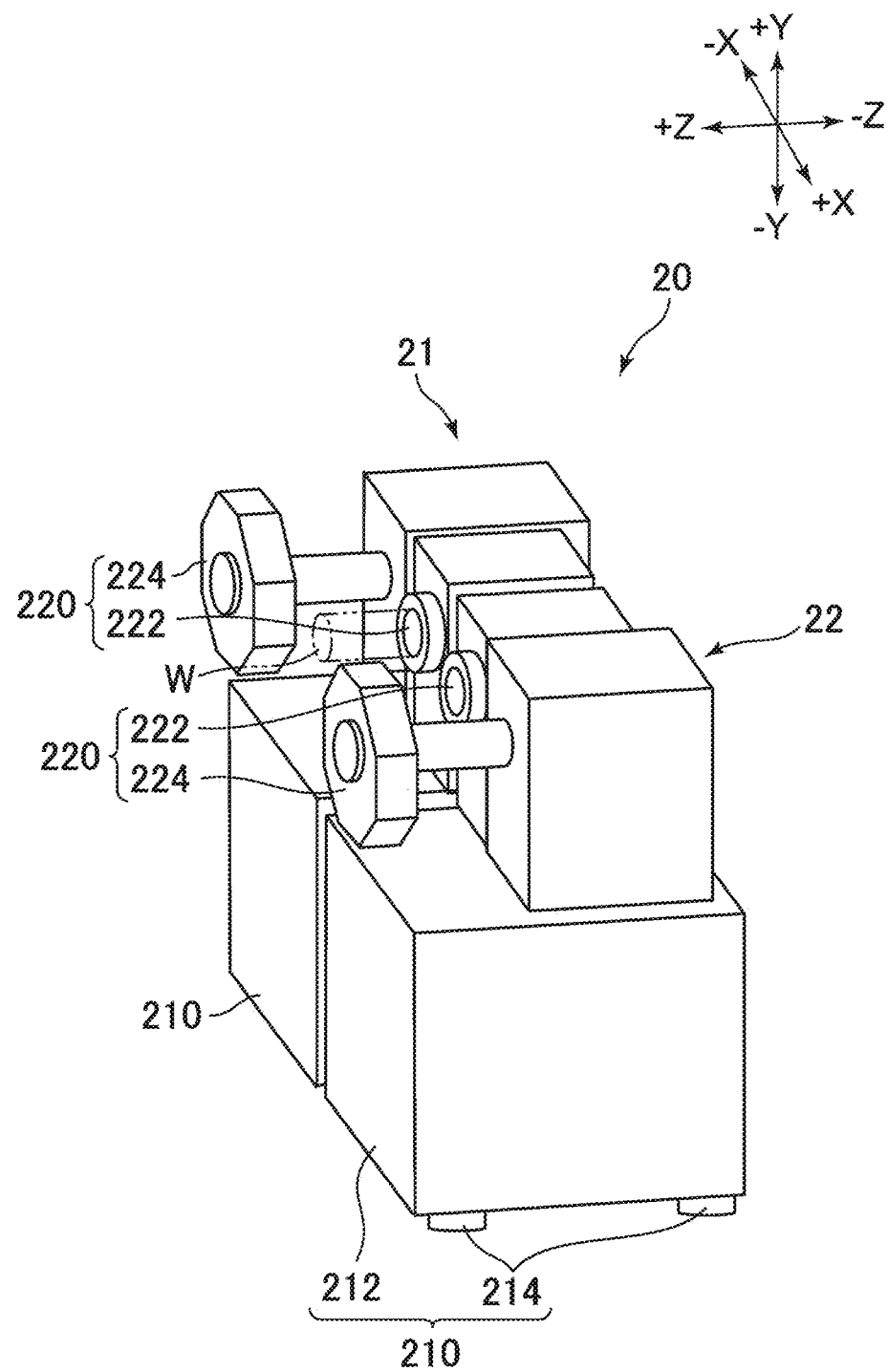
FIG. 3 is a perspective view showing an example of a machine tool.

A first preferred embodiment will be described below, with reference to the drawings. Configurations and functions of a machine tool system 10 according to the present preferred embodiment will be described, with reference to FIG. 1 to FIG. 3. FIG. 1 is a front elevation view showing an example of the machine tool system 10 according to the first preferred embodiment. FIG. 2 is a right-side view of the machine tool system 10 shown in FIG. 1. FIG. 3 is a perspective view showing an example of a machine tool 20 included in the machine tool system 10. It should be noted that illustration of tools 226 described later is omitted in FIG. 3.

As shown in FIG. 1 and FIG. 2, the machine tool system 10 includes a machine tool 20, a loader (transport apparatus) 30, a workpiece feeder 40, a workpiece collector 50, connecting plates (plates) 60, and a controller 70. This machine tool system 10 is installed on a floor surface (mounting surface) FS of a building of a factory or the like. In the machine tool system 10, the controller 70 controls the machine tool 20 and the loader 30, and the machine tool 20 processes a workpiece W transported by the loader 30. In the present preferred embodiment, the workpiece W is of a cylindrical shape, however, the workpiece W may be of an arbitrary shape and may, for example, be a disc-shaped workpiece. The workpiece W may be an elongated rod-shaped workpiece.

As shown in FIG. 1 and FIG. 2, the machine tool 20 includes a first processing apparatus 21, a second processing apparatus 22, and a reversing apparatus 23. The machine tool 20 processes the workpiece W transported by the loader 30. As shown in FIG. 1 and FIG. 3, the first processing apparatus 21 has a bed 210 and a processor 220. The first processing apparatus 21, for example, performs the first processing on the workpiece W via the processor 220.

The bed 210 has a main body 212 and a plurality of leveling bolts (supporters) 214. The main body 212 is, for example, of a rectangular parallelepiped shape, and is supported by the plurality of leveling bolts 214 and mounted on the floor surface FS. The leveling bolts 214 are attached in the vicinity of four corners on the lower face side of the main body 212, and each thereof comes in contact with the floor surface FS. That is to say, the bed 210 is mounted on the floor surface FS.

The bed 210 has the processor 220 mounted on an upper surface side thereof. The processor 220 has a main spindle 222, a turret 224 and a plurality of tools 226. The main spindle 222 is supported rotatably around an axis parallel to the Z direction (front-rear direction) and is rotated by a rotation driver not shown in the drawings. The main spindle 222 includes a chuck not shown in the drawings capable of gripping the workpiece W at a distal end thereof on the +Z side. The chuck has a plurality of gripping claws capable of gripping an end of the workpiece W. The main spindle 222 rotates the workpiece W gripped by the chuck around an axis parallel to the Z direction. The turret 224 is arranged on the −X side of the main spindle 222. The turret 224 is supported rotatably around an axis parallel to the Z direction and is rotated by a rotation driver not shown in the drawings. On an outer peripheral surface of turret 224 there are provided a plurality of tool holders to hold the tools 226. The plurality of tools 226 are, for example, cutting tool bits, end mills, or the like, and are attached respectively to the tool holders of the turret 224 in a detachable manner. The plurality of tools 226 may be tools of the same type or tools of different types.

The first processing apparatus 21 rotates the turret 224 to select a tool 226 for use from the plurality of tools 226 and moves the turret 224 in the X direction (and the Z direction) while axially rotating the workpiece W together with the main spindle 222, to thereby process the workpiece W via the tool 226. In such a case, the movement of the turret 224 in the X direction is controlled by the controller 70. The position to which the turret 224 is moved in the X direction (left-right direction) regulates the depth of cutting in the workpiece W.

As shown in FIG. 1 and FIG. 3, the second processing apparatus 22 is arranged on the +X direction side with respect to the first processing apparatus 21 and has the same components as those of the first processing apparatus 21. The second processing apparatus 22 performs the second processing on the workpiece W that has undergone the first processing performed by the first processing apparatus 21, for example. The second processing apparatus 22 differs from the first processing apparatus 21 in that the arrangement of the main spindle 222 and the turret 224 is reversed in the X direction. The first processing apparatus 21 and the second processing apparatus 22 each have an individual bed 210, however, the present invention is not limited to this form. For example, the first processing apparatus 21 and the second processing apparatus 22 may be configured to share one bed 210. The processing performed on the workpiece W by the second processing apparatus 22 may differ from the processing performed on the workpiece W by the first processing apparatus 21. Therefore, the tool 226 used by the processor 220 of the second processing apparatus 22 may be different from the tool 226 used by the processor 220 of the first processing apparatus 21.

As shown in FIG. 1 and FIG. 2, the reversing apparatus 23 is arranged on the +Y side (above) of the first processing apparatus 21 and the second processing apparatus 22. The reversing apparatus 23 is supported on the bed 210, for example, by a frame or the like not shown in the drawings. The reversing apparatus 23 reverses the workpiece W that has undergone the first processing performed by the first processing apparatus 21 in the Z direction before transporting the workpiece W to the second processing apparatus 22.

As shown in FIG. 1 and FIG. 2, the reversing apparatus 23 has chucks 231, 232 and a reverser 234. The chucks 231, 232 are arranged in a line along the X direction. The chucks 231, 232 each have gripping claws not shown in the drawings and can grip the workpiece W. The chuck 232 is provided on the reverser 234. The reverser 234 moves the chuck 232 so as to face the chuck 231. After having gripped an end of the workpiece W via the chuck 231, the reversing apparatus 23 causes the reverser 234 to move the chuck 232 and causes the chuck 232 to grip the opposite end of the workpiece W. Next, after the grip of the workpiece W via the chuck 231 has been released, the reverser 234 returns the chuck 232 to the original position thereof to thereby reverse the workpiece W in the Z direction. Such operations of the reversing apparatus 23 are controlled by the controller 70. It should be noted that the reversing apparatus 23 may be of any configuration. In a case where the workpiece W need not be reversed, the machine tool 20 need not include the reversing apparatus 23.

In the present preferred embodiment, the configuration including the first processing apparatus 21 and the second processing apparatus 22 has been described as an example of the machine tool 20, however, the present invention is not limited to this configuration. For example, the machine tool may include only either one of the first processing apparatus 21 and the second processing apparatus 22. Also, the machine tool 20 may include another processing apparatus in addition to the first processing apparatus 21 and the second processing apparatus 22, for example. In the present preferred embodiment, the form in which the tools 226 are attached to the turret 224 has been described as an example, however, the present invention is not limited to this form. For example, the tools 226 may be held by a comb-shaped tool post instead of the turret 224. In such a case also, by moving in the X direction (left-right direction), the comb-shaped tool post regulates the depth of cutting in the workpiece W performed by the tool 226.

The loader 30 has two, left and right, legs 31, a beam 32 (see FIG. 2), an X-guide 33, an X-slider 34, a Z-slider 35, an elevation rod 36, a loader head 37, and two, left and right, second legs (see FIG. 2). The loader 30 is a portal-type loader or a gantry loader. The loader 30 transports the workpiece W between the workpiece feeder 40, the first processing apparatus 21, the second processing apparatus 22, and the workpiece collector 50. For example, the loader 30 transports the workpiece W from the workpiece feeder 40 to feed it to the first processing apparatus 21, transports the workpiece W processed by the first processing apparatus 21 to the reversing apparatus 23, feeds the workpiece W reversed by the reversing apparatus 23 to the second processing apparatus 23 from the reversing apparatus 23, and transports the workpiece W processed by the second processing apparatus 22 to the workpiece collector 50 from the second processing apparatus 22.

The two, left and right, legs 31 are arranged on both the left and right sides respectively of the machine tool 20 on the +Z side (front side) of the machine tool 20. These legs 31 are spaced apart from the bed 210 of the machine tool 20. Each leg 31 has a leg main body 31A and a leveling bolt 31B. The leveling bolt 31B is attached to a lower end of the leg main body 31A and is in contact with the floor surface FS. The two, left and right, second legs 131 are arranged on both the left and right sides respectively of the machine tool 20 on the −Z side (rear side) of the machine tool 20. Each of the two second legs 131 is arranged on the rear side (−Z side) of the leg 31. These second legs 131 are spaced apart from the bed 210 of the machine tool 20. Each second leg 131 has a leg main body 131A and a leveling bolt 131B. The leveling bolt 131B is attached to a lower end of the leg main body 131A and is in contact with the floor surface FS. That is to say, in the present preferred embodiment, the two legs 31 and the two second legs 131 are both in contact with the floor surface FS.

Figure 4:
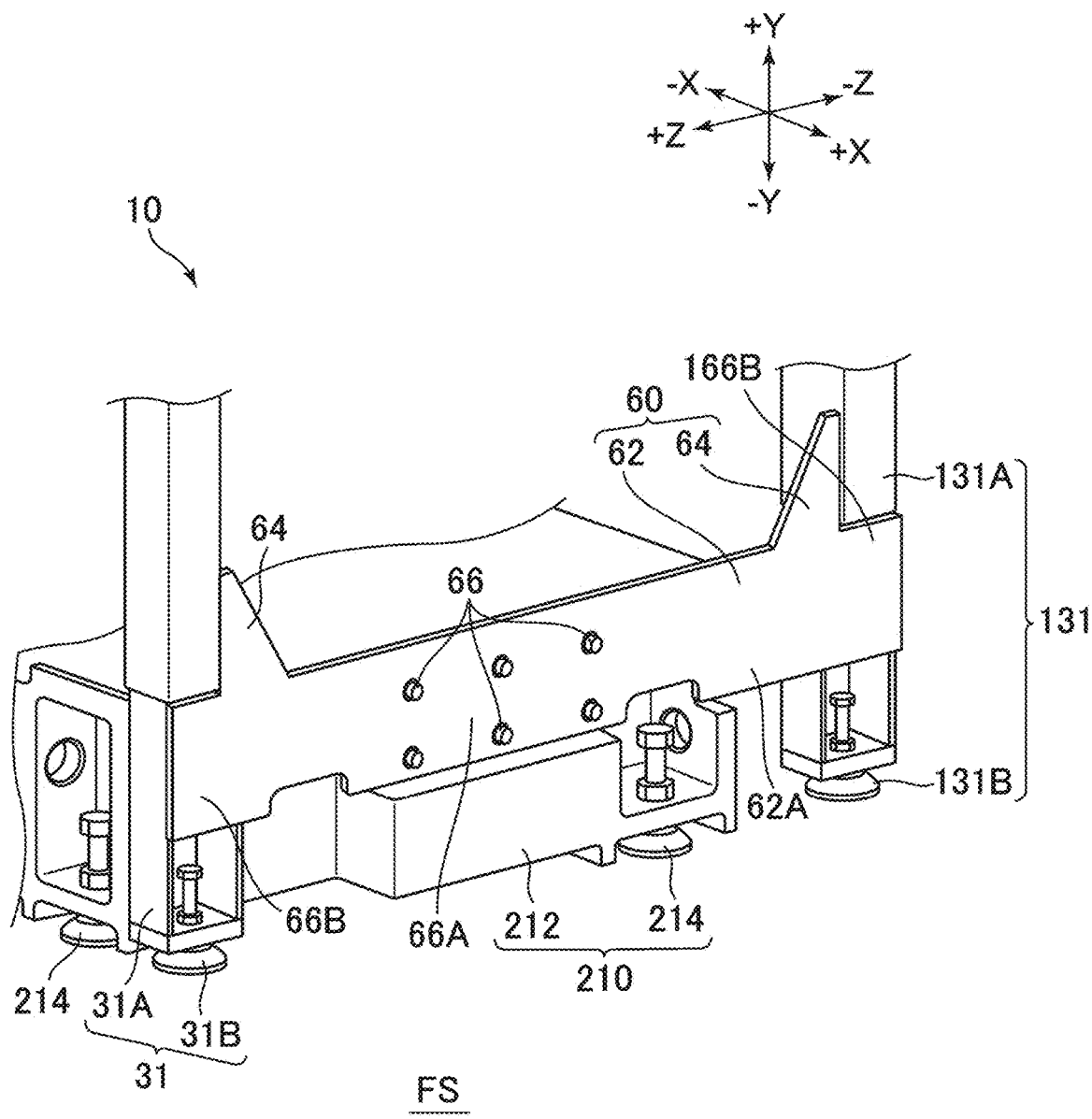
FIG. 4 is a perspective view of a lower right portion of the machine tool system according to the first preferred embodiment of the present invention.
Figure 5:
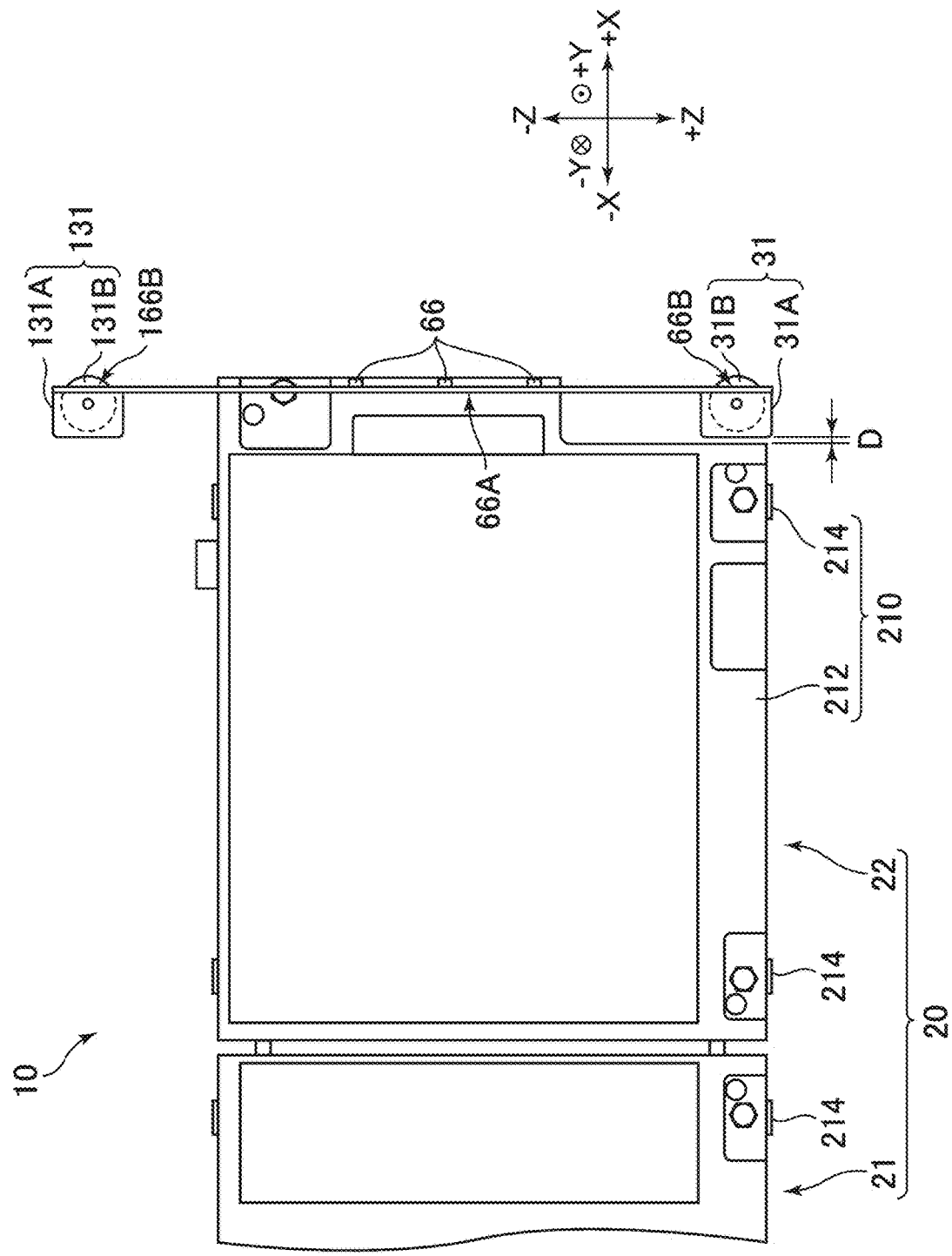
FIG. 5 is a plan view showing an example of an arrangement of a bed, a leg, and a connecting plate.

FIG. 4 is a perspective view of a lower right portion of the machine tool system 10. FIG. 5 is a plan view showing an example of an arrangement of the bed 210, the leg 31, and the connecting plate 60. As shown in FIG. 4 and FIG. 5, the leg 31 is arranged near the leveling bolt 214 of the bed 210. A clearance D exists between the leg 31 and the bed 210 in the X direction (left-right direction). FIG. 4 and FIG. 5 only show the +X side portion of the machine tool system 10, however, the −X side portion is also configured in a similar manner in which the leg 31 is arranged near the leveling bolt 214 of the bed 210, and a clearance D is formed between the leg 31 and the bed 210 in the X direction (left-right direction). The two second legs 131 are arranged in rear (in the −Z direction) of the respective legs 31 and apart from the bed 210 in the −Z direction.

As shown in FIG. 2, the beam 32 extends in the Z direction and connects an upper portion of the leg 31 and an upper portion of the second leg 131 to increase the rigidity of the loader 30. As shown in FIG. 1, FIG. 2 and so forth, the X guide 33 extends in the X direction and is fixed to upper ends of the two, left and right, legs 31 (leg main body 31A). The X-slider 34 is moved in the X direction (left-right direction) along the X-guide 33 by the driver not shown in the drawings. The Z-slider 35 is moved by a driver not shown in the drawings in the Z direction (front-rear direction) along a Z-guide that is included in the X-slider 34 and not shown in the drawings. The elevation rod 36 is moved by a driver not shown in the drawings in the Y direction (up-down direction) along an elevation guide that is included in the Z-slider 35 and not shown in the drawings. The loader head 37 is provided at a lower end of the elevation rod 36. The loader head 37 includes a chuck (gripping claws) not shown in the drawings and is capable of gripping an end of the workpiece W. The loader head 37 can switch the orientation of the gripped workpiece W between downward-facing (−Y direction) and side-facing (−Z direction) via a swivel joint or the like, for example.

The workpiece feeder 40 is arranged on the −X side of the machine tool 20. One or more workpieces W that have not been processed by the machine tool 20 are placed on the workpiece feeder 40. The workpiece collector 50 is arranged on the +X side of the machine tool 20. One or more workpieces W that have been processed by the machine tool 20 are placed on the workpiece feeder 50.

As shown in FIG. 1 and FIG. 2, the connecting plate 60 connects a lower part of the leg 31 to the bed 210. The connecting plate 60 also connects a lower part of the second leg 131 to the bed 210. That is to say, one connecting plate 60 connects the leg 31, the second leg 31, and the bed 210. In the machine tool system 10 of the present preferred embodiment, two of the connecting plates 60 are used. Of the two connecting plates 60, one connecting plate 60 is used on the −X side of the first processing apparatus 21 to connect the leg 31, the second leg 131, and the bed 210 of the first processing apparatus 21. The other one of the connecting plates 60 is used on the +X side of the second processing apparatus 210 to connect the leg 31, the second leg 131, and the bed 210 of the second processing apparatus 22. The two connecting plates 60 are identical or substantially identical, however, may be of different shapes.

As shown in FIG. 1, FIG. 2, FIG. 4 and FIG. 5, the connecting plate 60 is arranged upright and such that a plate surface 62A is aligned with the Z direction (front-rear direction). That is to say, the connecting plate 60 is arranged in a manner such that the plate surface 62A orthogonal to the plate thickness direction (left-right direction, X direction) thereof includes the Y direction (up-down direction) and the Z direction (front-rear direction). As shown in FIG. 2 and FIG. 4, the connecting plate 60 has a symmetrical shape as viewed in the X direction and has a main body 62 and two projections 64. The main body 62 is of a rectangular shape as viewed from the plate thickness direction thereof. The projections 64 are provided to increase the strength of connection between the leg 31 and the second leg 131. Each of the two projections 64 is of a triangular shape as viewed from the plate thickness direction thereof. The two projections 64 project upward from an upper end surface of the main body 62 at both ends in the longitudinal direction of the main body 62 (in the front-rear direction or the Z direction), with their inclined surfaces opposed to each other, and are provided so as to be shifted toward the center from both ends of the main body 62 in the longitudinal direction. The plate thickness and the vertical dimension of the connecting plate 60 can be set arbitrarily.

As shown in FIG. 4 and FIG. 5, the connecting plate 60 is connected to a side face of the bed 210 by a plurality of screws 66 arranged in the Z direction and the Y direction, defining a connection portion 66A. The connecting plate 60 is connected to the leg main body 31A of the leg 31 by screws or the like not shown in the drawings to define a connection portion 66B. The connecting plate 60 is connected to the leg main body 131A of the second leg 131 by screws or the like not shown in the drawings to define a connection portion 166B. In the longitudinal direction of the main body 62, the connection portion 66A deviates from the lengthwise center thereof toward the +Z side. That is to say, in the Z direction (front-rear direction), the distance between the connection portion 66A and the connection portion 66B is shorter than the distance between the connection portion 66A and the connection portion 166B. As a result, the supporting rigidity of the leg 31 in the X direction (left-right direction) and in the Y direction (up-down direction) is higher than the supporting rigidity of the second leg 131 in the X direction and in the Y direction. Since the leg 31 includes the X-guide 33 at an upper end thereof, it receives much of the load of the loader 30 and is likely to vibrate. Since the supporting rigidity of the legs 31 is high as mentioned above, the loader 30 can be operated stably. It should be noted that the two projections 64 are both arranged between the leg 31 and the second leg 131 as shown in FIG. 4.

As an example, the connecting plate 60 is a plate composed of metal and is elastically deformable in a direction orthogonal to the plate surface 62A (plate thickness direction). As described above, the connecting plate 60 is arranged upright and such that the plate surface 62A is aligned with the Z direction (front-rear direction). Therefore, the connecting plate 60 has a rigidity higher in the Y direction (up-down direction) and in the Z direction (front-rear direction) than in the X direction (left-right direction). That is to say, the connecting plate 60 has a rigidity capable of receiving the load of the loader 30 in the Y direction (up-down direction) while being allowed to flex (deform elastically) in the X direction (left-right direction). As a result, while receiving the load of the loader 30, if the leg 31 vibrates (oscillates) in the X direction, the connecting plate 60 flexes to reduce or prevent transmission of the vibrations in the X direction to the bed 210.

The controller 70 controls each component of the machine tool 20 and each component of the loader 30. The control of the operation of each component performed by the controller 70 will be described later.

Next, operations of the processing performed on the workpiece W by the machine tool system 10 according to the present preferred embodiment will be described, with reference to FIG. 6 to FIG. 9. FIG. 6 to FIG. 9 are diagrams for describing operations of the processing performed on the workpiece W by the machine tool system 10 of the present preferred embodiment and are front elevation views of the machine tool system 10 showing from the start of the processing to the end of the processing. These figures are numbered in chronological order of the processing operations.

Figure 6:
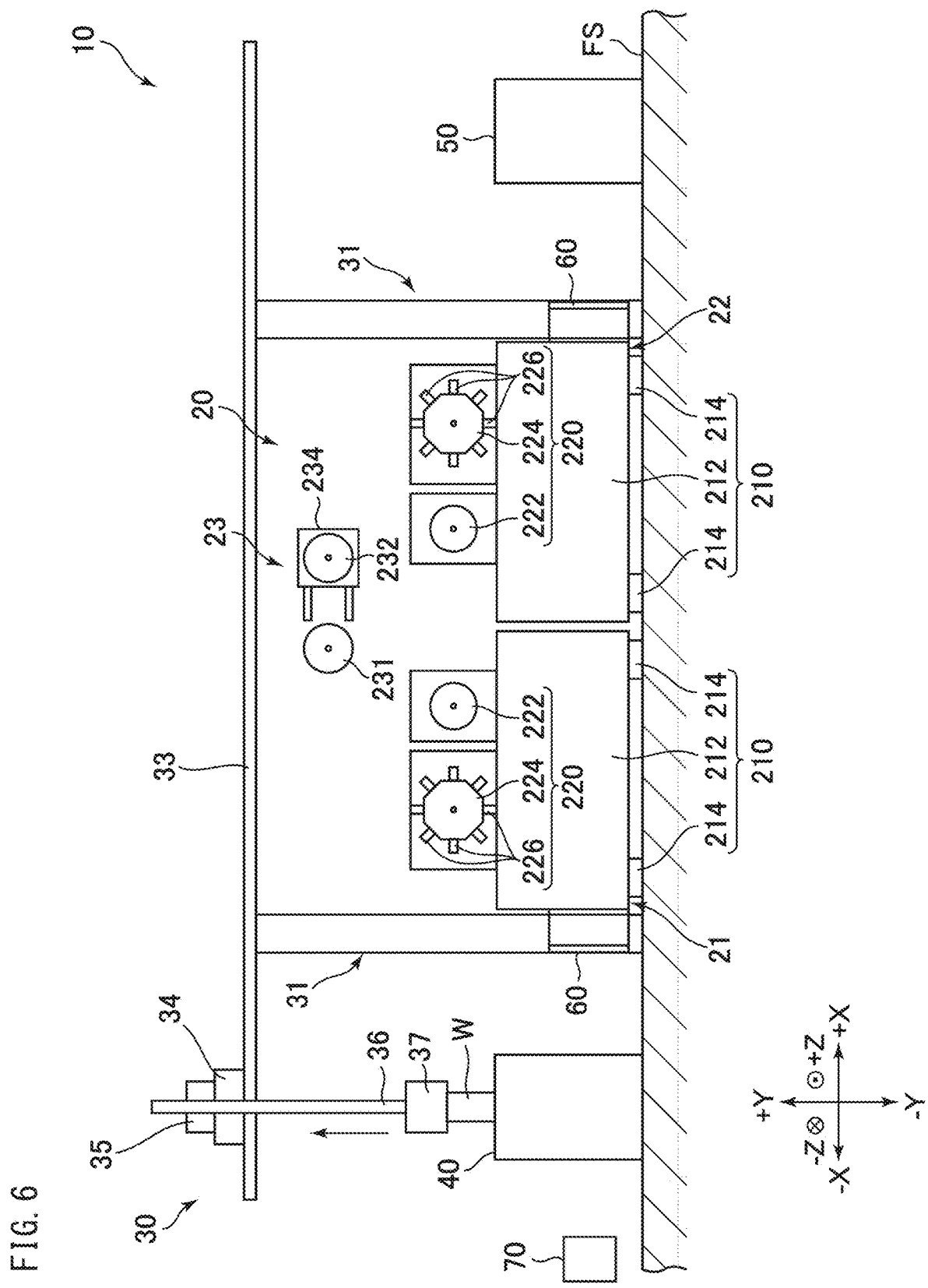
FIG. 6 is a diagram for describing a workpiece processing operation and is a diagram showing a state where a workpiece has been received from a workpiece feeder by a transport apparatus.
Figure 7:
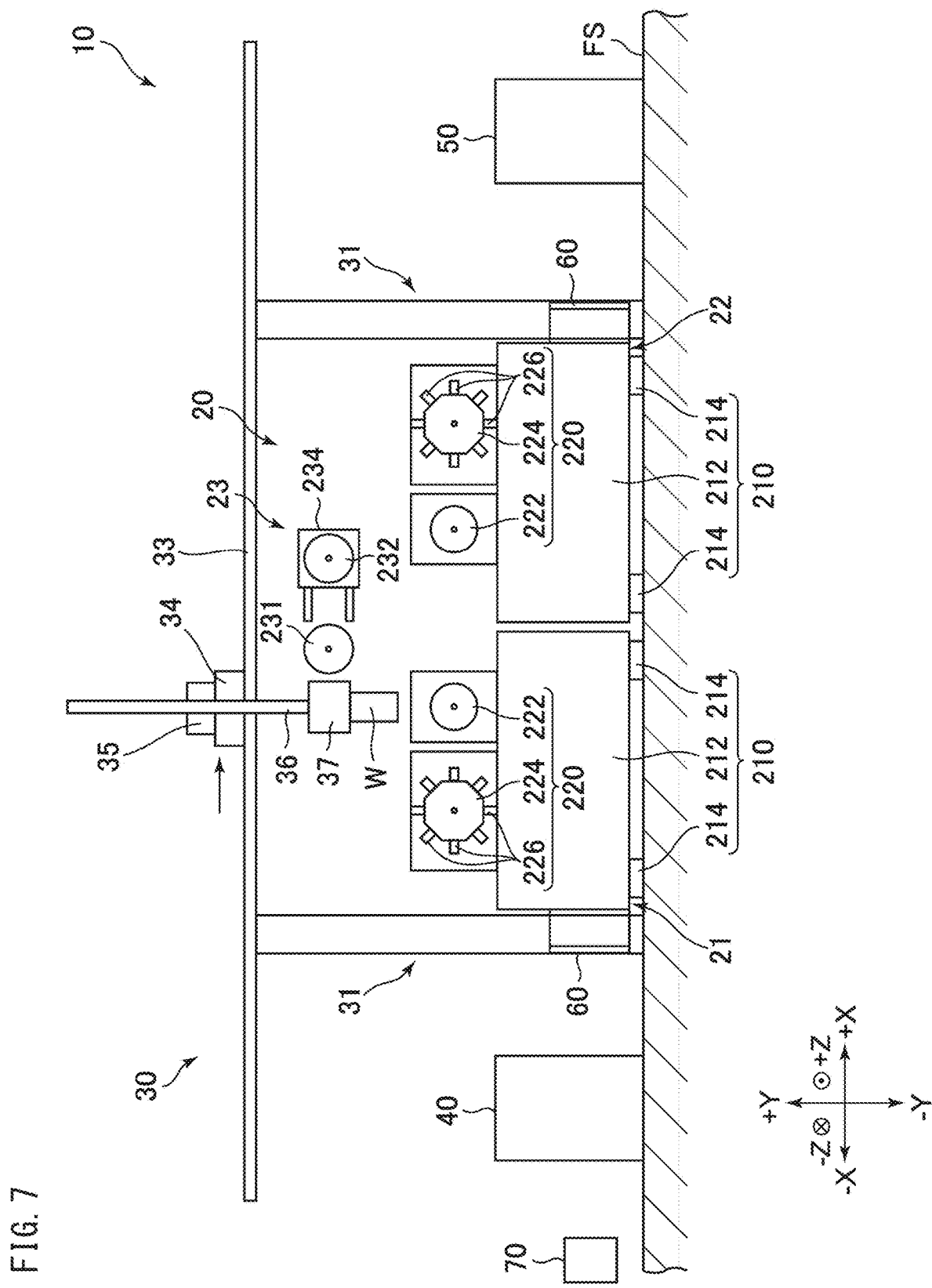
FIG. 7 is a diagram for describing a workpiece processing operation and is a diagram showing a state where the workpiece is being transported in the left-right direction by the transport apparatus.
Figure 8:
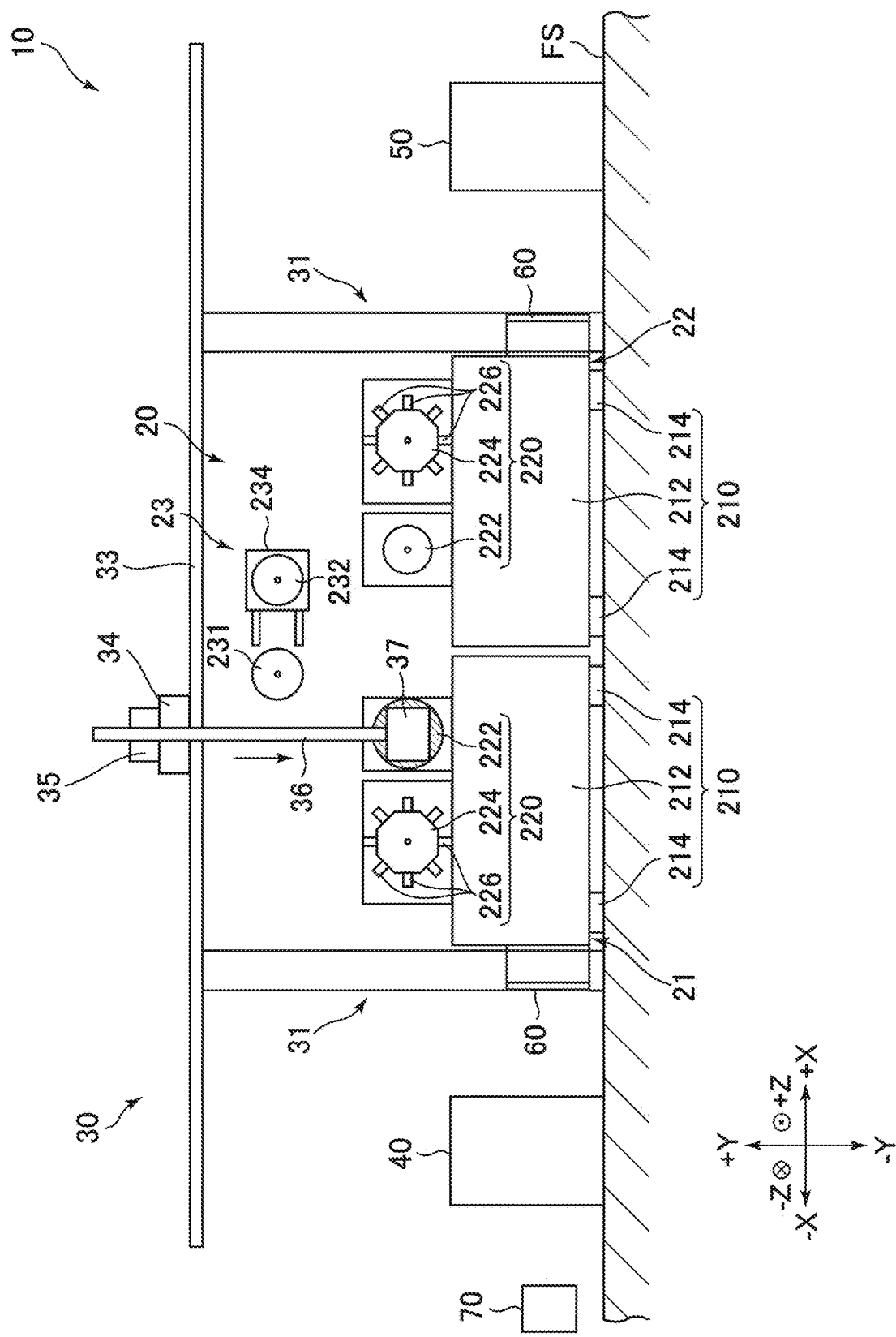
FIG. 8 is a diagram for describing a workpiece processing operation and is a diagram showing a state where the workpiece has been transported to a main spindle by the transport apparatus.
Figure 9:
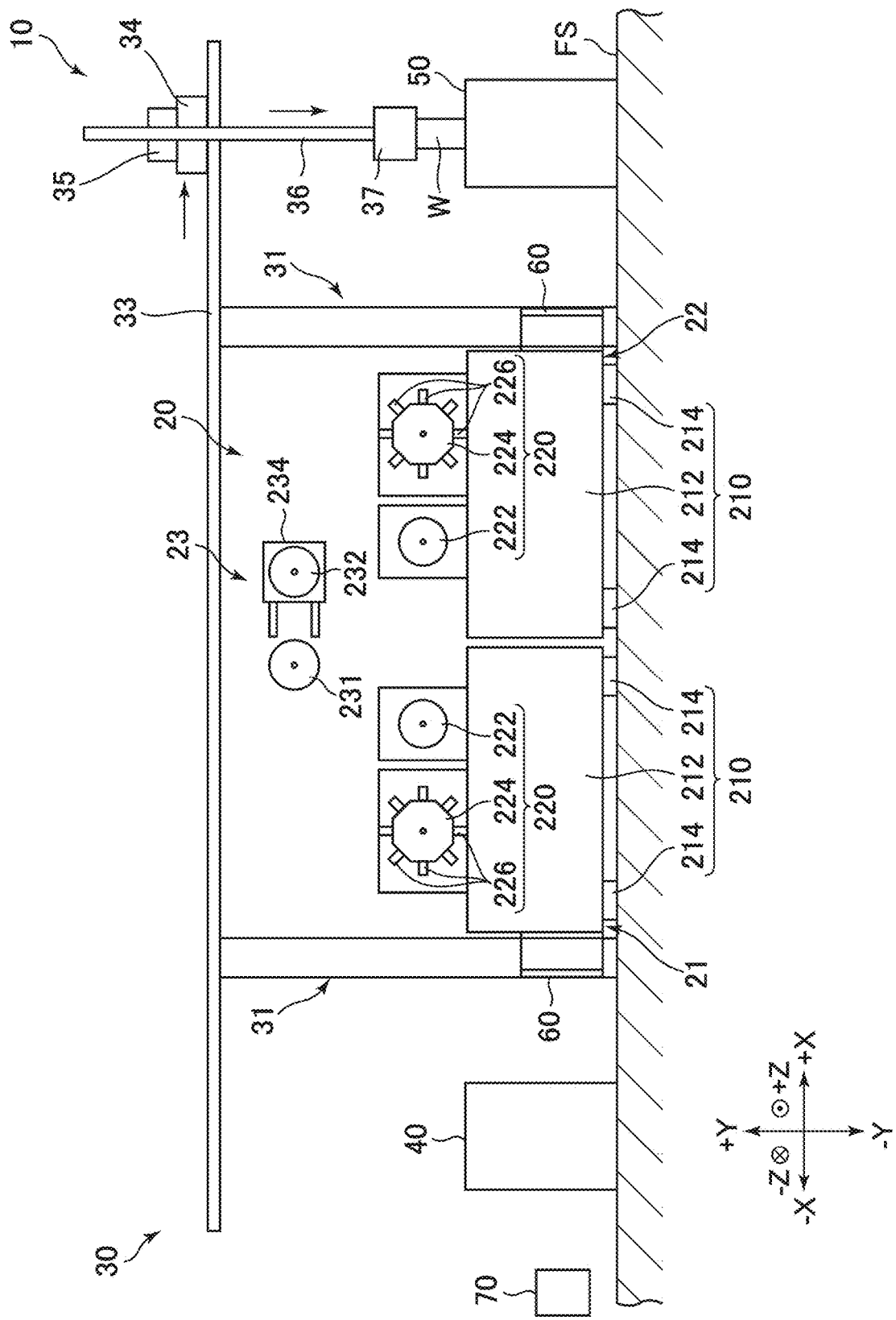
FIG. 9 is a diagram for describing a workpiece processing operation and is a diagram showing a state where the workpiece has been transferred to a workpiece collector by the transport apparatus.

When a worker inputs processing conditions and so forth for the workpiece W into an operation panel (interface) not shown in the drawings, the controller 70 performs control of the machine tool system 10 in accordance with the input information. First, as shown in FIG. 6, at the start of the processing, the loader head 37 of the loader 30 descends from above the workpiece feeder 40, grips the workpiece W, and then lifts it (see FIG. 6). As the loader head 37 ascends or descends, the leg 31 and the second leg 131 vibrate in the up-down direction (Y direction). Next, after the loader head 37 has ascended, the X-slider 34 moves in the +X direction along the X-guide 33 and stops above the main spindle 222 of the first processing apparatus 21 (see FIG. 7). As the X-slider 34 moves and stops in this manner, the leg 31 and the second leg 131 vibrate in the left-right direction (X direction). Next, the loader head 37 descends to a position opposed to the main spindle 222 (overlapping position in the Z direction) as the elevation rod 36 descends, and after changing the orientation of the workpiece W from downward direction to −Z side-facing, the Z-slider 35 moves in the −Z direction to thereby transfer the workpiece W to the main spindle 222 (see FIG. 8).

The first processing apparatus 21 axially rotates the workpiece W held by the main spindle 222 and performs processing on the workpiece W while moving the tool 226 attached to the turret 224 in the +X direction. When the processing has ended, the workpiece W held by the main spindle 222 is transferred to the loader head 37. The workpiece W on the loader head 37 is transferred to the chuck 231 of the reversing apparatus 23 by moving the X-slider 34, the Z-slider 35, and the elevation rod 36 (omitted in the drawings). The reversing apparatus 23 reverses the workpiece W by transferring the workpiece W from the chuck 231 to the chuck 232. After the loader head 37 has received the reversed workpiece W, the workpiece W is transferred to the main spindle 222 of the second processing apparatus 22 by moving the X-slider 34, the Z-slider 35, and the elevation rod 36 (omitted in the drawings).

The second processing apparatus 22 axially rotates the workpiece W held by the main spindle 222 and performs processing on the workpiece W while moving the tool 226 attached to the turret 224 in the −X direction. When the processing has ended, the workpiece W held by the main spindle 222 is transferred to the loader head 37. During the transfer of the workpiece W between the main spindle 222 and the reversing apparatus 23, the movement of the X-slider 34 causes the leg 31 and the second leg 131 to vibrate in the left-right direction (X direction), the ascent and descent of the elevation rod 36 causes the leg 31 and the second leg 131 to vibrate in the up-down direction (Y direction), and the movement of the Z-slider 35 causes the leg 31 and the second leg 131 to vibrate in the front-rear direction (Z direction).

Next, the X-slider 34 moves in the +X direction along the X-guide 33 and stops above the workpiece collector 50. The movement of the X-slider 34 performed in this manner causes the leg 31 and the second leg 131 to vibrate in the left-right direction (X direction). Next, the loader head 37 gripping the workpiece W, which has already undergone the processing, descends as the elevation rod 36 descends, and places the workpiece W on the workpiece collector 50 (see FIG. 9). The ascent and descent of the elevation rod 36 performed in this manner causes the leg 31 and the second leg 131 to vibrate in the up-down direction (Y direction). Through the operations exemplified above, the processing of the workpiece W according to the present preferred embodiment is completed. By repeating the above operations, a plurality of workpieces W are processed, and as such processing is performed on the workpieces W, the leg 31 and the second leg 131 vibrate in the left-right direction (X direction), the up-down direction (Y direction), and the front-rear direction (Z direction). The loader 30 continues to operate even during the processing being performed on the workpiece W by the first processing apparatus 21 and the second processing apparatus 22.

Next, actions of the first preferred embodiment will be described, with reference to the drawings. As mentioned above, the bed 210 of the machine tool 20 and the leg 31 and the second leg 131 of the loader 30 are connected to each other by the connecting plate 60. The connecting plate 60 is an elastic deformable plate, and the connection portion 66A that connects with the bed 210 and the connection portion 66B that connects with the leg 31 are displaced in the Z direction (front-back direction). The connection portion 66A that connects with the bed 210 and the connection portion 166B that connects with the second leg 131 are also displaced in the Z direction (front-back direction).

Figure 10:
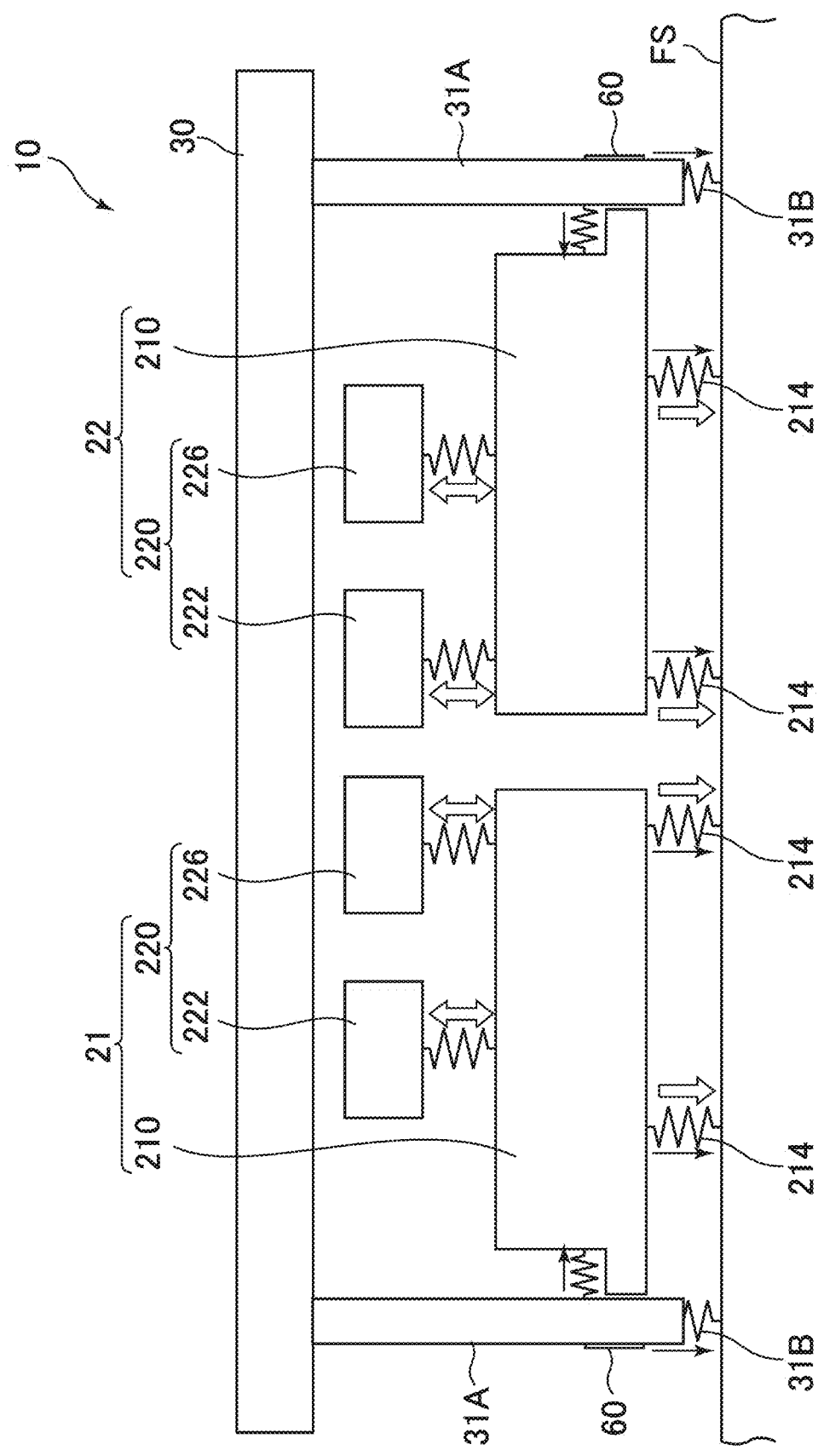
FIG. 10 is a schematic diagram showing routes over which vibrations generated by the transport apparatus are transmitted to a mounting surface in the machine tool system according to the first preferred embodiment of the present invention.

FIG. 10 is a schematic diagram showing routes over which vibrations generated by the loader 30 are transmitted to the floor surface FS in the machine tool system 10 according to the present preferred embodiment. The black arrows denote the propagation direction of vibrations of the legs 31 generated by the loader 30, and the white arrows denote the propagation direction of vibrations generated by the main spindles 222 of the first processing apparatus 21 and the second processing apparatus 22. As shown in FIG. 10, in the machine tool system 10 of the present preferred embodiment, the leg 31 and the bed 210 are connected by the connecting plate 60. Therefore, the relative positions of the machine tool 20 and the loader 30 to each other are unlikely to displace, and thus the workpiece W can be transferred smoothly between the machine tool 20 and the loader 30. Some of the vibrations generated by the operation of the loader 30 are transmitted to the bed 210 of the machine tool 20 and transmitted from the leveling bolts 214 of the bed 210 to the floor surface FS. Since the connecting plate 60 has a high rigidity in the up-down direction and the front-rear direction, vibrations of the legs 31 in the up-down direction and the front-rear direction are transmitted from the connecting plate 60 to the floor surface FS through the leveling bolts 214 of the bed 210. The vibrations generated by the main spindle 222 and the tool 226 (turret 224) of the machine tool 20 are transmitted to the floor surface FS through the leveling bolts 214 of the bed 210.

The connecting plate 60 is elastically deformable in the X direction, and furthermore, the connection portion 66A that connects with the bed 210 and the connection portion 66B that connects with the leg 31 are displaced in the Z direction (front-back direction). Therefore, even when the leg 31 vibrates in the X direction, the elastic deformation of the connecting plate 60 absorbs some of the vibrations and reduces transmission of the vibrations in the X direction to the bed 210. The X direction (left-right direction) is a direction in which the depth of cutting in the workpiece W performed by the tool 226 is regulated in the first processing apparatus 21 and the second processing apparatus 22. Therefore, since the vibrations of the loader 30 (legs 31) in the X direction are unlikely to be transmitted to the bed 210, variations in the depth of cutting in the workpiece W are small, and a reduction in the accuracy of the processing performed on the workpiece W can be suppressed. Although not illustrated in FIG. 10, similarly, even when the second leg 131 vibrates in the X direction, the elastic deformation of the connecting plate 60 absorbs some of the vibrations and reduces transmission of the vibrations in the X direction to the bed 210. That is to say, in the present preferred embodiment, it is possible to reduce or prevent displacement of the relative positions of the machine tool 20 and the loader 30 while suppressing a reduction in the accuracy of the processing performed on the workpiece W.

As shown in FIG. 1 and FIG. 2, in the machine tool system 10 of the present preferred embodiment, the two legs 31 are in contact with the floor surface FS via the leveling bolts 31B. The two second legs 131 are also in contact with the floor surface FS via the leveling bolts 131B. As a result, some of the vibrations generated by the loader 30 can be transmitted directly to the floor surface FS. Therefore, vibrations to be absorbed by the connecting plate 60 can be reduced. That is to say, by releasing some of the vibrations generated by loader 30 from the legs 31, it is possible to adjust the magnitude of the vibrations transmitted to bed 210.

The connecting plate 60 has a rigidity more capable of receiving the load of the loader 30 in the Y direction (up-down direction) and in the Z direction (front-rear direction) than in the X direction (left-right direction). Accordingly, when the connecting plate 60 receives the vibrations of the loader 30, even if it deforms elastically in the X direction, it is unlikely to or does not deform in the Y direction and the Z direction. Therefore, in the machine tool system 10 of the present preferred embodiment, transmission of vibrations of the legs 31 (second legs 131) in the X direction to the bed 210 is reduced or prevented, and vibrations of the legs 31 in the Y direction and the Z direction are transmitted to the bed 210 so as to be dampened together with the bed 210. In many cases, vibrations in the Y direction and the Z direction have limited influence on the accuracy of the processing performed on the workpiece W. Therefore, it is possible by reducing or preventing vibrations in the X direction to suppress a reduction in the accuracy of the processing performed on the workpiece W.

In the present preferred embodiment, the legs 31 and the second legs 131 are in contact with the floor surface FS via the leveling bolts 31B, 131B. That is to say, a majority of the load of the loader 30 can be released from the legs 31 and the second legs 131 to the floor surface FS through the leveling bolts 31B, 131B. As a result, the burden on the connecting plate 60 in the up-down direction (Y direction) is reduced, and the rigidity of the connecting plate 60 in the up-down direction can be reduced, which reduces the sourcing cost of the connecting plate 60 and prevents deterioration of the connecting plate 60.

In the present preferred embodiment, as shown in FIG. 2, FIG. 4 and FIG. 5, one connecting plate 60 is connected to the leg 31 and the second leg 131. That is to say, one connecting plate 60 is used for both connecting with the leg 31 and connecting with the second leg 131. Therefore, the number of connecting plates 60 used can be reduced compared to the case where the leg 31 and the second leg 131 are connected by separate connecting plates 60, and as a result, the manufacturing cost of the machine tool system 10 can be reduced. In the present preferred embodiment, the configuration is not limited to using one connecting plate 60 to connect the leg 31 and the second leg 131 to the bed 210. For example, the leg 31 and the second leg 131 may each be connected to the bed 210 by a separate connecting plate 60.

Second Preferred Embodiment

Figure 11:
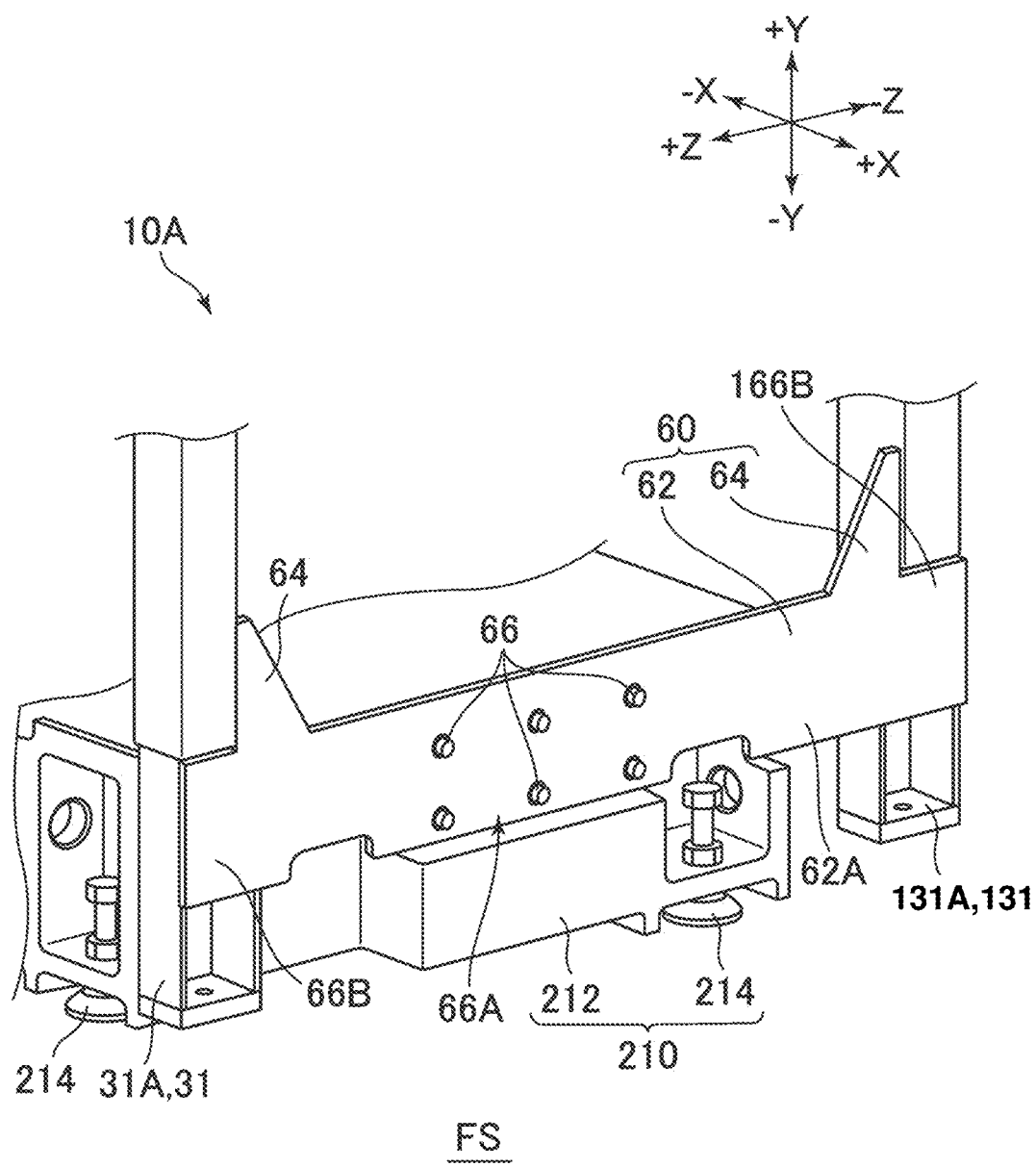
FIG. 11 is a perspective view of a lower right portion of a machine tool system according to a second preferred embodiment of the present invention.
Figure 12:
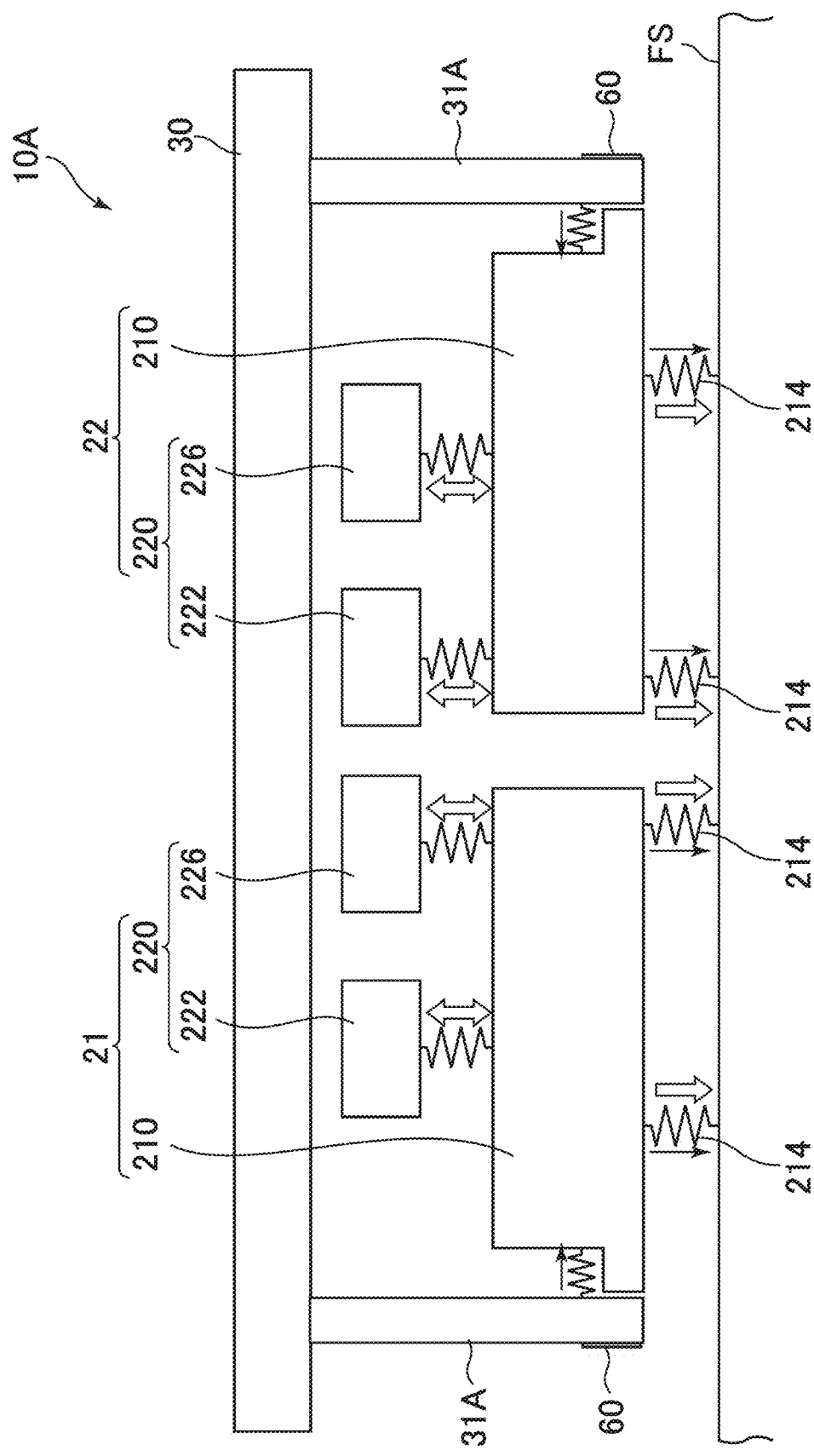
FIG. 12 is a schematic diagram showing routes over which vibrations generated by a transport apparatus are transmitted to a mounting surface in the machine tool system according to the second preferred embodiment of the present invention.

Next, a machine tool system 10A according to a second preferred embodiment of the present invention will be described, with reference to FIG. 11 and FIG. 12. FIG. 11 is a perspective view of a lower right portion of the machine tool system 10A according to the second preferred embodiment. In the following description, configurations similar to those of the machine tool system 10 of the first preferred embodiment are assigned with the same reference signs and descriptions thereof are omitted or simplified. In the following description, portions that differ from those of the machine tool system 10 according to the first preferred embodiment will be described. As shown in FIG. 11, the machine tool system 10A differs from the machine tool system 10 of the first preferred embodiment (see FIG. 1 and so forth) in that the two legs 31 and the two second legs 131 are spaced apart in the Y direction (up-down direction) from the floor surface FS. That is to say, in the machine tool system 10A, the leg 31 is composed of the leg main body 31A only, the second leg 131 is composed of the leg main body 131A only, and the leg 31 and the second leg 131 do not have the leveling bolts 31B, 131B.

The leg 31 (leg main body 31A) is arranged directly above or in the vicinity of a position directly above the leveling bolt 214 of the bed 210 and is apart from the bed 210. Here, the term "vicinity" means, for example, a position shifted from a position directly above the leveling bolt 214, and as shown in FIG. 5, the leg main body 31A and the leveling bolt 214 of the bed 210 are adjacent to each other in the X direction while having a clearance D therebetween in the Y direction. In the present preferred embodiment, the leg main body 31A is arranged in the vicinity of a position directly above the leveling bolt 214, however, the present invention is not limited to this form. For example, the leg 31 (leg main body 31A) may be arranged directly above the leveling bolt 214.

The connecting plate 60 has a rigidity capable of receiving the load of the loader 30 in the up-down direction. In the present preferred embodiment, the load of the loader 30 is received by the bed 210 through the connecting plate 60. Since each leg 31 is arranged in the vicinity of a position directly above the leveling bolt 214, the bending moment on the bed 210 can be reduced and vibrations transmitted from the leg 31 to the bed 210 through the connecting plate 60 can be released quickly to the floor surface FS compared to the case where the leg 31 is positioned far away from the position directly above the leveling bolt 214. That is to say, the influence of the load of the loader 30 or of the vibrations of the loader 30 on the bed 210 can be reduced. The same applies to the case where the leg 31 is arranged directly above the leveling bolt 214.

Next, actions of the present preferred embodiment will be described, with reference to FIG. 12. FIG. 12 is a schematic diagram showing routes over which vibrations generated by the loader 30 are transmitted to the floor surface FS in the machine tool system 10A according to the present preferred embodiment. The black arrows denote the propagation direction of vibrations generated by the loader 30, and the white arrows denote the propagation direction of vibrations generated by the main spindles 222 of the first processing apparatus 21 and the second processing apparatus 22. As shown in FIG. 12, in the machine tool system 10A of the present preferred embodiment, the positions of the machine tool 20 and the loader 30 are unlikely to displace relatively to each other, and the connecting plate 60 reduces transmission of vibrations of the loader 30 (legs 31) in the X direction to the bed 210, which suppresses a reduction in the accuracy of the processing performed on the workpiece W. The load of the loader 30 and the vibrations of the leg 31 in the up-down direction and the front-rear direction are transmitted from the connecting plate 60 to the floor surface FS through the leveling bolts 214 of the bed 210. That is to say, in the present preferred embodiment, as with the first preferred embodiment described above, it is possible to reduce or prevent displacement of the relative positions of the machine tool 20 and the loader 30 while suppressing a reduction in the accuracy of the processing performed on the workpiece W.

The preferred embodiments of the present invention have been described above. However, the technical scope of the present invention is not limited to the forms described in the above preferred embodiments. For example, the present invention may omit some of the components described in the above preferred embodiments. Also, one or more of the components described in the above preferred embodiments may be combined where appropriate. The contents of all documents cited in the detailed description of preferred embodiments of the present invention are incorporated herein by reference to the extent permitted by law.

Furthermore, in the preferred embodiments described above, the distance between the connection portion 66A that connects with the bed 210 and the connection portion 66B that connects with the leg 31 is shorter than the distance between the connection portion 66A and the connection portion 166B that connects with the second leg 131. However, the present invention is not limited to this form. For example, the distance between the connection portion 66A and the connection portion 66B may be the same as the distance between the connection portion 66A and the connection portion 166B, and for example, the distance between the connection portion 66A and the connection portion 66B may be longer than the distance between the connection portion 66A and the connection portion 166B.

One or more of the elements or features described in the above preferred embodiments may be omitted in some cases. One or more of the elements or features described in the above preferred embodiments may be combined where appropriate. The contents of Japanese Patent Application No. 2020-086628 and all documents cited in the detailed description of preferred embodiments of the present invention are incorporated herein by reference to the extent permitted by law.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A machine tool system comprising:
    a machine tool including a processor to process a workpiece with a tool, and the machine tool including a bed on which the processor is mounted;
    a transport apparatus including two legs spaced apart from one another in a front-rear direction and also spaced apart from the bed, the transport apparatus being configured to transport the workpiece and feed the workpiece to the processor or discharge the workpiece from the processor; and
    a plate that connects the bed to the legs and is elastically deformable;
    wherein the plate is upright such that a plate surface is aligned with the front-rear direction; and
    a connection portion of the plate that connects with the bed is displaced in the front-rear direction from connection portions of the plate that connect with the legs.

2. The machine tool system according to claim 1, wherein the processor includes a main spindle to hold and rotate the workpiece; and
    the tool is movable in a left-right direction that is transverse to the front-rear direction to regulate a depth of cutting in the workpiece being rotated.

3. The machine tool system according to claim 2, wherein the processor includes a tool turret on which the tool is provided, and wherein plural additional tools are provided to the turret.

4. The machine tool system according to claim 3, wherein the tools comprise cutting tool bits and/or end mills.

5. The machine tool system according to claim 1, wherein the legs are in contact with a mounting surface on which the bed is mounted.

6. The machine tool system according to claim 1, wherein the legs are spaced apart in an up-down direction from a mounting surface on which the bed is mounted.

7. The machine tool system according to claim 6, wherein the plate has a rigidity such that the plate is capable of receiving a load of the transport apparatus in a vertical direction.

8. The machine tool system according to claim 6, wherein the bed includes a support in contact with the mounting surface; and
    the legs are directly above or in a vicinity of a position directly above the support, and wherein the legs are spaced apart from the bed.

9. The machine tool system according to claim 1, wherein an additional leg is provided, and is spaced from the front leg in a left-right direction that is transverse to the front-rear direction, and a further additional leg is provided spaced from the rear leg in the left-right direction.

10. The machine tool system according to claim 1, wherein the connection portion of the plate that connects with the bed is between the connection portions of the plate that connect with the two legs.

* * * * *